Figure 1:
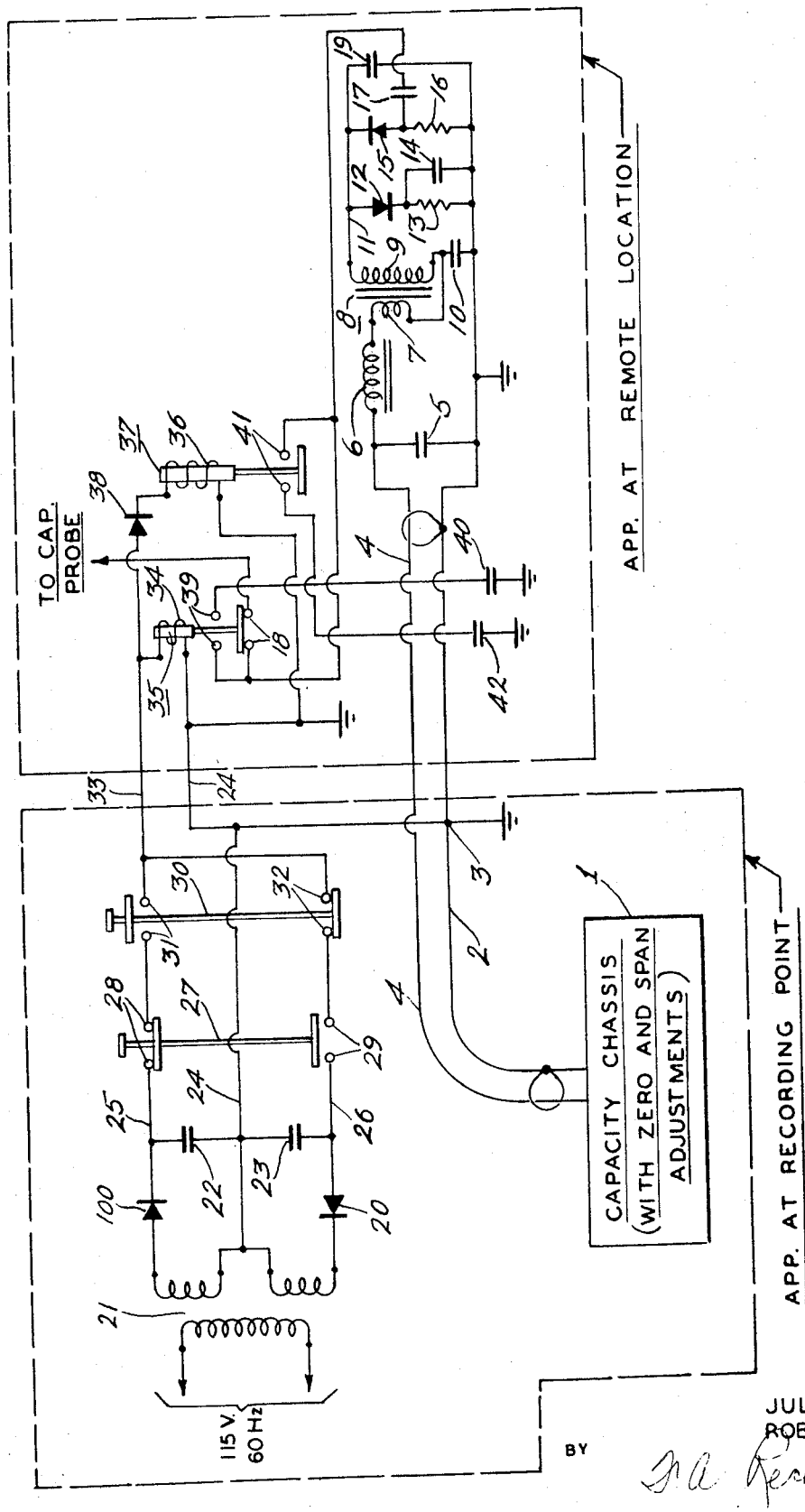

United States Patent [19]

Lerner et al.

[11] 3,735,371
[45] May 22, 1973

[54] ARRANGEMENT FOR MULTIPLEXING OF A PLURALITY OF REMOTELY-LOCATED CAPACITIVE PROBES

[75] Inventors: Julius Lerner Broomall; Robert Mayer, Ardmore, Pa.

[73] Assignee: Sun Oil Company of Pennsylvania, Philadelphia, Pa.

[22] Filed: June 2, 1971

[21] Appl. No.: 149,216

[52] U.S. Cl. ............ 340/177 CA, 340/176, 340/183, 340/200
[51] Int. Cl. .............................................. G08c 15/06
[58] Field of Search ...................... 340/177 CA, 200

[56] References Cited

UNITED STATES PATENTS

| 2,848,710 | 8/1958 | Owen | 340/200 |
| 2,943,258 | 6/1960 | Shawan | 340/200 |
| 3,073,160 | 1/1963 | Shawan | 340/200 |
| 3,077,588 | 2/1963 | Revesz | 340/200 |
| 3,537,085 | 10/1970 | Mayer | 340/200 |
| 3,636,537 | 1/1972 | Terry | 340/177 CA |
| 3,646,538 | 2/1972 | Frick | 340/200 |

Primary Examiner—Thomas B. Habecker
Attorney—George L. Church, Donald R. Johnson and Wilmer E. McCorquodale, Jr. et al.

[57] ABSTRACT

A switching system for selectively switching in, from a recording point or control room, capacitors which are physically located at a remote point and which are utilized for circuit adjustment in a measuring apparatus utilizing a capacitive-type sensor. Discloses also a multiplexing arrangement for a plurality of sensors, wherein the circuit adjustments of the individual sensors may be made selectively, and wherein the sensors may be selectively and individually connected to common capacitance measuring and indicating equipment.

3 Claims, 3 Drawing Figures

INVENTORS
JULIUS LERNER
ROBERT MAYER

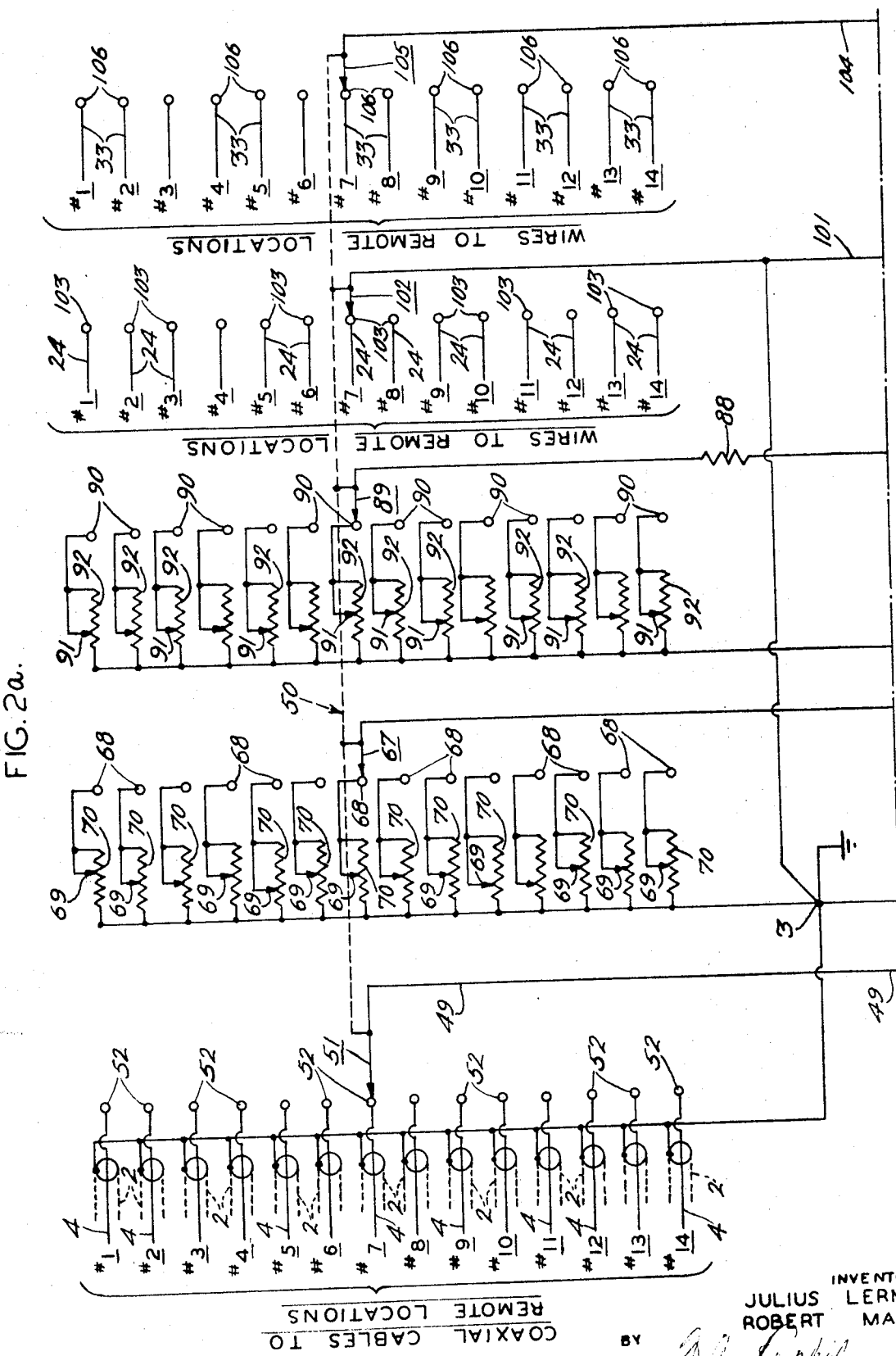

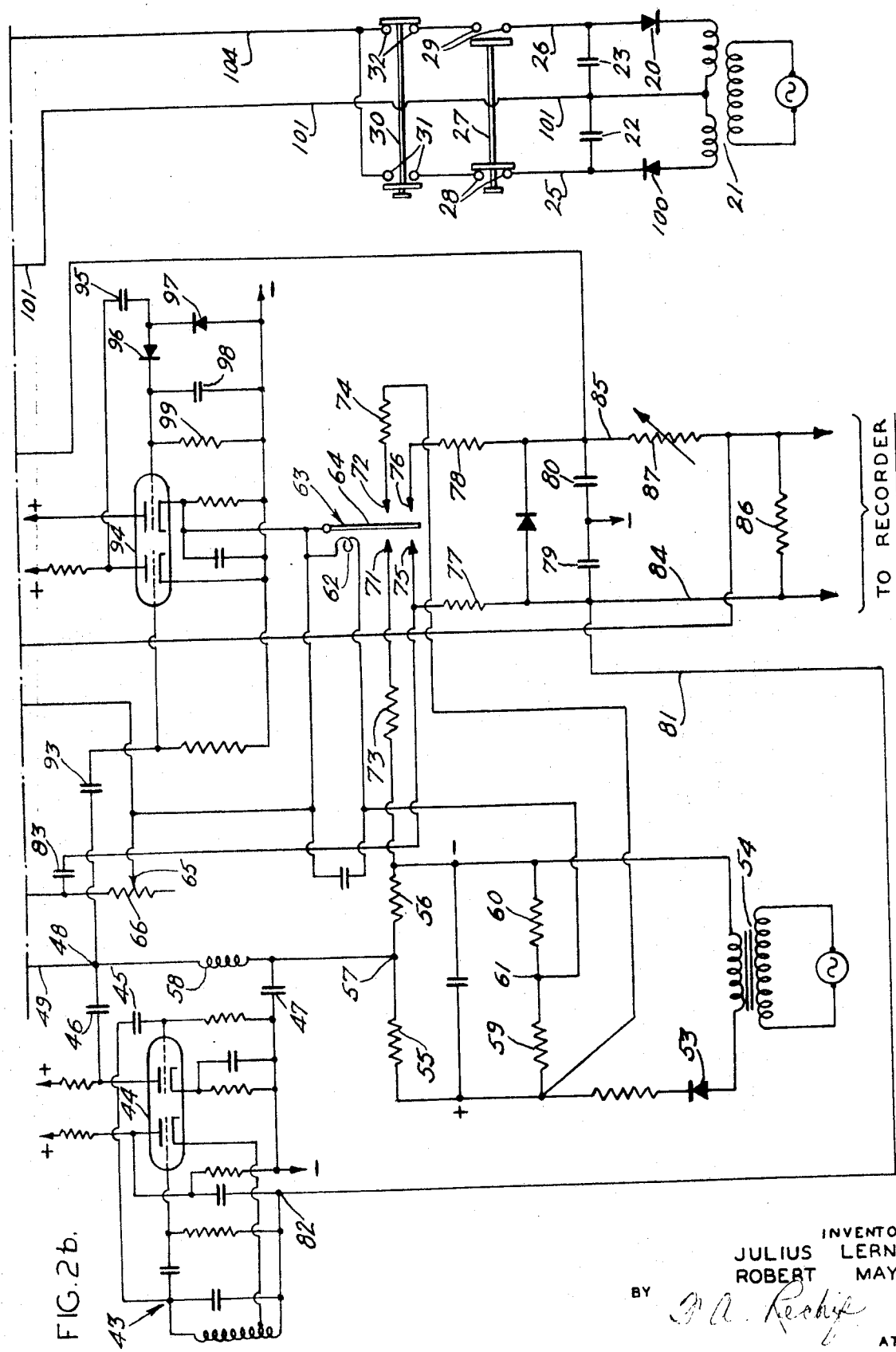

ARRANGEMENT FOR MULTIPLEXING OF A PLURALITY OF REMOTELY-LOCATED CAPACITIVE PROBES

This invention relates, in general, to the multiplexing of a plurality of remotely-located capacitive-type sensors or probes, such as may be used for measuring level, moisture, composition, etc. For convenience herein, and merely by way of example only, it will be described in connection with the measurement of level. In a capacitance type level meter, the variation of capacitance as material rises and falls between condenser plates of a probe is measured to secure a measure of surface level. A meter of this general type is disclosed in Shawhan U.S. Pat. No. 3,073,160, dated Jan. 15, 1963, to which further reference will be made hereinafter.

A typical use of the arrangement of this invention is for the measurement of liquid level in "propane storage bullets," which are high-pressure tanks used for the storage of propane in liquid phase. In this use, there is utilized the difference in the dielectric constants of the vapor and of liquid propane. The vapor (above the liquid) has a dielectric constant of 1.00, and the average dielectric constant of the liquid over the temperature range of interest is 1.56. Thus, the higher the liquid level, the greater will be the portion of the annular space between the condenser plates of the probe which is filled with the higher dielectric constant liquid. By setting the zero of the instrument at the capacitance measured by the probe when there is only vapor between the plates, and the full scale of the instrument at the capacitance measured by the probe when there is a maximum level of liquid between the plates, a linear scale of liquid level is obtained.

Speaking generally, the level meter of the type previously mentioned involves the measurement at a recording point (generally located in a control room) of the level in a remotely-located tank or other vessel (such as the "propane bullet" previously mentioned). To help in setting the meter or instrument up in the manner mentioned in the preceding paragraph, a "low" or "zero" checkpoint, and a "high" or "span" check point are provided. Physically, these "check points" are fixed capacitors, located at the remote or probe end of the system, which are connected into the measuring circuit (in place of the measuring probe) so that the instrument can be adjusted to properly set the "zero" and "full scale" or "span"; the low check point (or capacitor) corresponds to some capacitance value at the low end of the scale, and the high check point (or capacitor) corresponds to some capacitance value at the high end of the scale.

According to prior practice, for initial installation or setting up, and also for subsequent checking in the way of trouble-shooting, it was necessary for a man to go out to the remote probe location to connect in first one, then the other of these check points or capacitors, then go back to the control room or recording point to observe the data after each one of these separate changes of connection at the remote location. This is disadvantageous, being time-consuming and laborious.

An object of this invention is to provide a novel switching system for adjustment of capacitive type meters.

Another object is to provide a switching system for capacitive type meters which enables connection of low and high check points, for adjustment of the instrument, to be effected from the recording location (or control room).

When using a plurality of capacitive probes to measure levels in a plurality of tanks, such as in a plurality of "propane bullets" of the type mentioned previously, and when there is no need to monitor all the tank levels simultaneously, it is economically advantageous to use a common electronic measuring circuit or chassis, and to selectively switch in the probe desired. Such a common electronic measuring circuit involved, according to prior practice, only a single "low" or "zero" and "high" or "span" adjustment (setting) on the chassis, which meant that all of the probes utilized necessarily had to be of the same configuration and range.

According to this invention, a multiplexing arrangement is provided which utilizes separate "zero" and "span" adjustments (settings) for each probe, permitting probes of different configurations and ranges to be used at each remote (multiplexed) installation. Such an arrangement provides much more flexibility of installation.

The objects of this invention are accomplished, briefly, in the following manner: At each remote location (that is, at each "bullet" wherein the liquid level is to be measured), there is a capacitive sensing probe (for sensing the liquid level) connected to a remote transmitter by a short length of coaxial cable. Each remote transmitter is connected to the central switching and recording unit by means of a coaxial cable and a pair of wires. The switching unit contains a selector switch for connecting the coaxial cable of the desired "bullet" into a common electronic circuit, for simultaneously connecting into the circuit a corresponding "zero" potentiometer and a corresponding "span" potentiometer, and for simultaneously setting up a circuit from the switching unit to the desired "bullet" over the corresponding pair of wires. When a selection is made, a switching voltage may be transmitted over the pair of wires to the selected "bullet" to switch in either a desired "low" or "high" check point (capacitor), for appropriate adjustment of the "zero" and "span" for that particular remote location.

A detailed description of the invention follows, taken in conjunction with the accompanying drawings, wherein:

FIG. 1 is a schematic of a switching circuit according to this invention, for switching in high or low check points at a single remote location from a central location or control room; and FIGS. 2a and 2b, taken together, provide a schematic of a multiplexing circuit according to this invention, utilizing the switching circuit of FIG. 1.

Now referring to FIG. 1, a capacity type level meter according to the invention includes, at the recording point or control room, a capacity chassis 1. This chassis 1 contains electronic circuitry for supplying high frequency excitation to a remotely-located capacitance (either a capacitive probe, for measuring liquid level, or a fixed capacitance for making initial adjustments of the circuitry), and for measuring the value of the remotely-located capacitance. The circuitry of chassis 1 is preferably the same as that disclosed in the aforementioned patent, and will be described more in detail hereinafter, in connection with FIGS. 2a-2b. The chassis includes "zero" and "span" adjustments, in the form of potentiometers which are connected to function as variable resistors.

The chassis 1 is connected to the "remote transmitter" portion of apparatus located at a remote point (immediately adjacent the bullet" wherein the liquid level is to be measured) by means of a coaxial cable 2 whose outer conductor or sheath is shown as grounded at the terminal 3. This ground is the effective reference for both high frequency potentials and for direct switching potentials in the system.

At the end of the coaxial cable 2 remote from the chassis 1, there is a so-called remote transmitter. The central conductor 4 of this cable may be connected to the grounded sheath through a capacitor 5. It is also connected through a toroidal coil 6 (which may typically have an inductance value of 2.5 millihenries) to the smaller winding 7 of a transformer 8 having its larger winding 9 connected as illustrated to the smaller winding providing an autotransformer. The connection of the two windings is joined to ground through a capacitor 10. The unconnected end of the winding 9 is connected to the line 11. Between this line and ground a diode 12 is connected in series with the parallel arrangement of a resistor 13 and a fixed reference capacitor 14. Also connected between the line 11 and ground is a diode 15 in series with a resistor 16, and from the common junction of items 15 and 16 a connection extends through a capacitor 17 of large capacitance value and through a normally closed pair of relay contacts 18 to one plate of a capacitive probe whose other plate is grounded. The plates of the capacitive or measuring probe both extend through the level of the liquid to be measured (which is contained within the "bullet" previously mentioned). As is usual with measuring probes of this type, the probe elements or plates are spaced to provide the plates of a capacitor between which the level of the material rises or falls to provide a varying capacitance as a measure of the liquid level. It will be noted that the diodes 12 and 15 are oppositely poled with respect to the line 11 and ground. Also connected between the line 11 and ground is a fixed capacitor 19.

Elements 5–18 of the remote transmitter (which are coupled to the capacity chassis 1 by means of coaxial cable 2), together with chassis 1 provide a capacity type liquid level measuring instrument which functions in essentially the same manner as does the capacity type level meter described in the aforementioned patent.

Briefly, by means of a switching voltage supplied from chassis 1 and operating through diodes 12 and 15, the capacitance presented by the measuring probe and the capacitance of the reference capacitor 14 are alternately switched into the remote transmitter circuit. High frequency oscillations are supplied to the said circuit from chassis 1. A voltage is developed proportional to the capacitance of capacitor 14; another voltage is developed proportional to the capacitance presented by the measuring probe, and the difference between these two voltages is measured in chassis 1. This is what takes place during the normal "probe" or "run" operation of the measuring instrument, and is described in complete detail in the above-identified patent.

As described in the reference patent, a pair of adjustable resistors are included in the chassis 1, for initial adjustment or calibration of the instrument. One of these is utilized for a "zero" adjustment, and the other for a "scale range" or "span" adjustment. In order to effect these adjustments, it is necessary that a "low check point" be connected into the circuit (in place of the measuring probe) for the "zero" adjustment, and a "high check point" be connected into the circuit (again in place of the measuring probe) for the "span" adjustment. These "low and high check points" are provided by means of fixed capacitors of known value which are located at the remote location. According to the present invention, a switching system, operated from the recording point or control room, is provided for switching in these calibration or adjustment capacitors when desired.

At the recording point, there is provided a d.c. power supply, including a pair of diode rectifiers 100 and 20 connected in full-wave fashion to the secondary of a transformer 21 whose primary is supplied from the a.c. power mains; capacitors 22 and 23 are connected respectively from the output electrode of each diode to a lead 24 which is connected to the midpoint of the secondary of transformer 21 and serves as the reference point or ground of the power supply output. It will be appreciated that, when the power supply described is energized, a voltage which is positive with respect to ground (lead 24) appears on output lead 25, and a voltage which is negative with respect to ground (lead 24) appears on output lead 26.

A double-pole, double-throw momentary push-button switch ("zero" or "low check" switch) 27 has a pair of normally closed contacts 28 connected in series in lead 25 and a pair of normally open contacts 29 connected in series in lead 26. A similar double-pole, double-throw momentary push-button switch 30 ("span" or "high check" switch) has a pair of normally open contacts 31 connected in series in lead 25 and a pair of normally closed contacts 32 connected in series in lead 26. Beyond switches 27 and 30 (which is to say, on the side thereof opposite the rectifiers 100 and 20), leads 25 and 26 are connected together to a lead 33 which, along with zero potential or ground lead 24, constitutes a pair of wires which are also connected between the apparatus at the remote location and the apparatus at the recording point or control room. Operation of push button 27 closes its contacts 29 to apply a voltage negative with respect to ground 24 to lead 33, while operation of push button 30 closes its contacts 31 to apply a voltage positive with respect to ground 24 to lead 33. The opening of contacts 28 when push button 27 is operated, and the opening of contacts 32 when push button 30 is operated, ensure that no short-circuiting of the power supply can occur as a result of inadvertent operation of both push buttons simultaneously.

At the remote location, one end of the operating coil 34 of a relay 35 is connected directly to lead 33 and the other end of coil 34 is connected to the ground point. Also at the remote location, one end of the operating coil 36 of a relay 37 is connected to lead 33 through a diode 38 poled to pass only a positive switching voltage, and the other end of coil 36 is connected to the ground point.

The normally closed contacts 18 previously mentioned (which are connected in series between the remote transmitter proper and the measuring probe) are carried by relay 35, which is to say that when relay 35 is energized, contacts 18 are opened to disconnect the measuring probe from the remainder of the circuit. In addition, relay 35 carries a pair of normally open contacts 39 which when closed by energization of such relay connect a "low check point" capacitor 40 into the remote transmitter (through capacitor 17). One plate of the fixed, known "zero" capacitor 40 (which is located at the remote point) is connected to a relay contact 39, while the other plate of this capacitor is connected to ground.

Relay 37 carries a pair of normally open contacts 41 which when closed by energization of such relay connect a fixed, known capacitor 42 (located at the remote point) into the remote transmitter (through capacitor 17); one plate of capacitor 42 is connected to a relay contact 41, while the other plate of this capacitor is connected to ground.

When the operator desires to make a "low" or "zero" check or adjustment, he depresses push button 27, which causes a negative voltage to be applied to lead 33, resulting in energization of the remote relay 35 to open its contacts 18 and close its contacts 39. This disconnects the capacitive measuring probe from the "remote transmitter" circuit and substitutes therefor the "low check point" or "zero" capacitor 40, of fixed, known value. He then adjusts the "zero" adjustable resistor on the chassis 1 to bring the recorder at the recording point to some predetermined low value on its scale, while holding the "low check" button 27 depressed. It may be here noted that the relay 37 is not energized under these conditions (negative voltage on lead 33), because the diode 38 is poled in the other direction.

When the operator desires to make a "high" or "span" check or adjustment, he depresses push button 30, which causes a positive voltage to be applied to lead 33, resulting in energization of both remote relays 35 and 37 (diode 38 being poled in the right direction for energization of the latter relay). Contacts 18 of relay 35 then open, contacts 39 then close, and contacts 41 of relay 37 then close. This disconnects the capacitive measuring probe from the "remote transmitter" circuit and substitutes therefor the two capacitors 40 and 42 (of fixed, known value) connected in parallel; the parallel combination of these two capacitors comprises the "high check point" or "span" capacitance. The operator then adjusts the "span" adjustable resistor on the chassis 1 to bring the recorder at the recording point to some predetermined high value on its scale, while holding the "high check" button 30 depressed.

During normal operation of the instrument for measuring liquid level (which may be thought of as the "probe" or "run" position of the instrument), neither of the push buttons 27 or 30 is depressed, neither relay 35 nor relay 37 is energized, and the capacitive measuring probe is connected into the "remote transmitter" circuit, by way of normally closed contacts 18. From the chassis 1, a 0 to 10 millivolt signal is fed to a recorder (not shown), in accordance with the teachings of the previously-mentioned patent.

When a plurality of capacitive measuring probes are used to measure liquid levels in a plurality of tanks, and when there is no need to monitor all the tank levels simultaneously, it is economically advantageous to use a multiplexing arrangement, wherein a common capacity chassis is used and the desired probe is selectively switched thereto. Each of the plurality of measuring probes may have associated therewith respective low and high check points, and the switching system of FIG. 1 may be adapted to an arrangement utilizing a plurality of probes, to provide selective switching in of any desired one of the low or high check points.

Refer now to FIGS. 2a–2b, which illustrate an arrangement of the type described in the preceding paragraph. All of the apparatus in this figure is located at the recording point (control room). FIGS. 2a–2b illustrate in detailed fashion the capacity chassis which was referred to only rather generally in connection with FIG. 1.

There is indicated at 43 an oscillator operating at a frequency which may typically be of the order of 15 Khz, though the frequency may vary through wide limits. The oscillator comprises, in association with conventional circuitry, the left half of the dual triode 44. The oscillator 43 feeds its output through a capacitor 45 to an amplifier including the right half of triode 44. Capacitors 46 and 47 isolate the amplifier from a direct potential standpoint from the remaining portions of the apparatus to be described.

The capacitor 46 is connected at 48 to a conductor 49 which is adapted to be connected to the central conductor 4 of a selected coaxial cable 2 which extends from the apparatus at the recording point to the probe device at a particular selected tank or other vessel in which level is to be measured. The selection is made in the first deck of a multi-deck, multi-position, ganged selector switch indicated generally by numeral 50. Conductor 49 is connected to the single pole or movable contact 51 of the first deck of switch 50; contact 51 is adapted to selectively engage any one of a group of fixed contacts or positions 52 which may be fourteen in number (for example) and to which are respectively connected the central conductors of individual coaxial cables which extend to various remote locations. Each of these coaxial cables may correspond to cable 2 of FIG. 1 and each is connected to a respective remotely-located apparatus corresponding to that of FIG. 1. In the selector switch position illustrated in FIG. 2a, the seventh coaxial cable is connected to terminal 48 of the capacity chassis. The sheaths of all of the coaxial cables are shown as grounded at the terminal 3.

By moving the contact 51 to engage any selected one of the fourteen fixed contacts 52, a corresponding one of the fourteen coaxial cables 2 (that is, the central conductor of a corresponding one of the cables), which lead to as many remote locations or remote transmitters, may be connected to terminal 48 on the common capacity chassis. Thus, the contact 51 may be operated to select a particular channel or remote transmitter, that is, to couple the selected channel to the capacity chassis by means of its respective coaxial cable 2.

A low voltage d.c. power supply is provided by an arrangement including a diode rectifr 53 supplied by the secondary of a transformer 54 whose primary is energized from the commercial current supply. A divider is provided by the equal resistors 55 and 56 joined at the terminal 57 which is connected to the capacitor 47 and through choke 58 to the capacitor 46 and terminal 48. Another voltage divider is provided by the equal resistors 59 and 60 joined at a terminal 61.

To the terminal 61 there is connected one end of the winding 62 of a polarized relay 63. The movable contact 64 of this relay is connected to the other end of winding 62 and to the movable contact 65 of a potentiometric resistor 66 one end of which is connected to the ground terminal 3. The resistor 66 is the "chassis zero potentiometer," and in the multiplexing arrangement of FIGS. 2a–2b this common or chassis zero potentiometer is originally set at its maximum value of resistance and is left there; this potentiometer is therefore not used for making a zero adjustment of the instrument, as it is in the patent previously mentioned.

The movable contact 64 of relay 63 is connected to the single pole or movable contact 67 of the second deck of switch 50; contact 67 (ganged with contact 51) is adapted to selectively engage any one of a group of fixed contacts or positions 68 which may be 14 in number (for example) and to which are respectively connected the movable contacts 69 of individual potentiometric resistors 70 one end of each of which latter is connected to the ground terminal 3. Each of the resistors 70 comprises a "separate zero potentiometer" which is individual to a corresponding remote transmitter (or measuring probe, during use of the instrument for measuring liquid levels).

By moving the contact 67 to engage any selected one of the fourteen fixed contacts 68, a corresponding one of the resistors 70 is connected in parallel with the "chassis zero potentiometer" 66 on the common capacity chassis. Thus, movement of the contact 67 selects a particular "separate zero potentiometer" when a particular channel is selected by the switch 50, this "selection" of the zero potentiometer being made by connection of the selected potentiometer into the common capacity chassis, in parallel with the "chassis zero potentiometer" 66. For "zero" adjustment of a particular channel, the "low check point" for that channel is connected into the remote transmitter of the channel, as will be described hereinafter (in part, by selection of the channel by means of switch 50), and then the "low" or "zero" adjustment of that channel is made by suitable manipulation of the corresponding movable contact 69.

The movable contact 64 operates between one pair of fixed contacts 71 and 72 which are respectively connected through the resistors 73 and 74 to the negative and positive terminals of the power supply energized from the transformer 54. A second pair of contacts 75 and 76 engageable by the movable contact 64 are connected respectively through resistors 77 and 78 to terminals of capacitors 79 and 80, the other terminals of which are joined and connected to a negative supply terminal of a high voltage power supply. The junction between resistors 77 and capacitor 79 is connected through a connection 81 to a terminal 82, for controlling the cathode potential of oscillator 43 and thereby the amplitude of the oscillator output. Contact point 75 is connected through a capacitor 83 to the ground terminal 3. The unjoined terminals of the capacitors 79 and 80 are respectively connected through lines 84 and 85 to a recorder or indicating meter (not shown), for recording or indicating changes in level measured; the recorder or meter is shunted by a resistor 86.

In series with the recorder or meter (specifically, in series in the lead 85) is an adjustable resistor 87 (in actual practice, this may be a potentiometric resistor) which is the "scale range adjustment" of "chassis span potentiometer." In the multiplexing arrangement of FIGS. 2a–2b this common or chassis span potentiometer is originally set at its maximum value of resistance and is left there; this potentiometer is therefore not used for making a scale range adjustment of the instrument, as it is in the patent previously mentioned.

The junction between capacitor 80 and resistor 87 is connected through a resistor 88 to the single pole or movable contact 19 of the third deck of switch 50; contact 89 (ganged with contacts 67 and 51) is adapted to selectively engage any one of a group of fixed contacts or positions 90 which may be fourteen in number (for example) and to which are respectively connected the movable contacts 91 of individual potentiometric resistors 92 one end of each of which latter is connected to the end of resistor 87 opposite to capacitor 80. Each of the resistors 92 comprises a "separate span potentiometer" which is individual to a corresponding remote transmitter (or measuring probe, during use of the instrument for measuring liquid levels).

By moving the contact 89 to engage any selected one of the fourteen fixed contacts 90, a corresponding one of the resistors 92 is connected in parallel with the "chassis span potentiometer" 87 on the common capacity chassis. Thus, movement of the contact 89 selects a particular "separate span potentiometer" 92 when a particular channel is selected by the switch 50, this "selection" of the span potentiometer being made by connection of the selected potentiometer into the common capacity chassis, in parallel with the "chassis span potentiometer" 87. For "span" adjustment of a particular channel, the "high check point" for that channel is connected into the remote transmitter of the channel, as will be described hereinafter (in part, by selection of the channel by means of switch 50), and then the "high" or "span" adjustment of that channel is made by suitable manipulation of the corresponding movable contact 91.

A capacitor 93 connects the central conductor 4 of the selected coaxial cable 2 (as selected by the first deck contact 51 of switch 50) with the grid of the left half of a dual triode 94, this left triode half being arranged in an amplifier circuit and providing its output through capacitor 95 to a peak voltmeter arrangement comprising diodes 96 and 97, a capacitor 98, and a resistor 99 to provide an input to a cathode follower which serves as a measure of the high frequency signals delivered from the amplifier half of triode 94. The cathode follower includes the right half of triode 94; the cathode of this half of triode 94 is connected to the movable contact 64 of the relay 63.

At the recording point, there is again utilized a d.c. power supply for switching purposes, which power supply is quite similar to that previously described (at 100, 20–32) in connection with FIG. 1. In the multiplexing arrangement of FIGS. 2a–2b, however, the lead 101 (which is connected to the midpoint of the secondary of transformer 21, and which serves as the reference point or ground of the power supply output) is connected to the ground terminal 3 and is also connected to the single pole or movable contact 102 of the fourth deck of switch 50; contact 102 (ganged with contacts 51, 67, and 89) is adapted to selectively engage any one of a group of fixed contacts or positions 103 which may be 14 in number (for example) and to which are respectively connected the individual "ground" leads 24 which extend (like the lead 24 in FIG. 1) to the various remote locations. That is, each lead 24 constitutes one wire of the separate pair of wires which are connected between each remote apparatus and the control room or recording point.

In the arrangement of FIGS. 2a–2b, the lead 104 (to which leads 25 and 26 are both connected, beyond switches 27 and 30) is connected to the single pole or movable contact 105 of the fifth deck of switch 50; contact 105 (ganged with contacts 51, 67, 89, and 102)

is adapted to selectively engage any one of a group of fixed contacts or positions 106 which may be 14 in number (for example) and to which are respectively connected the individual "signal voltage" leads 33 which extend (like the lead 33 in FIG. 1) to the various remote locations. Each lead 24, plus its corresponding lead 33, constitutes a pair of wires which are connected between each remote apparatus and the single recording point or control room.

By moving the contacts 102 and 105 to engage, respectively, any selected one of the fixed contacts 103 or any selected one of the fixed contacts 106, a selected pair of leads 24, 33 is connected to the output leads 101, 104 of the switching voltage power supply. Thus, movement of the contacts 102 and 105 selects a particular channel or remote apparatus for energization from the switching voltage power supply, by means of push buttons 27 or 30.

In the multiplexing arrangement of FIGS. 2a–2b, there is provided at each measuring point (i.e., at each "propane bullet") a duplicate of the apparatus in FIG. 1 which is enclosed by the dotted-line box labeled "Apparatus at Remote Location"; each such remotely-located apparatus is connected to the recording point by means of a separate coaxial cable such as 2, FIG. 1 (referred to above in connection with the first deck of switch 50), and also by a pair of wires such as 24 and 33, FIG. 1 (referred to above in connection with the fourth and fifth decks of switch 50).

The contacts 102 and 105 enable the appropriate voltage from the switching voltage power supply to be applied to the selected pair of leads 24, 33 for the channel or remote apparatus desired. The switching arrangement of FIGS. 2a–2b operates in similar manner to the similar arrangement of FIG. 1. If push button 27 is depressed, a voltage negative with respect to ground is applied to lead 104, which through the fourth and fifth decks of selector switch 50 is applied to whichever one of the fourteen channels has been selected by this switch. This transmission of a negative voltage connects the "low check point" of the selected channel or remote transmitter into the common capacity chassis of FIG. 2b (at terminal 48), in place of the measuring probe of the selected channel. If push button 30 is depressed, a voltage positive with respect to ground is applied to lead 104, which through the fourth and fifth decks of selector switch 50 is applied to whichever one of the fourteen channels has been selected by this switch. This transmission of a positive voltage connects the "high check point" of the selected channel or remote transmitter into the common capacity chassis of FIG. 2b (at terminal 48), in place of the measuring probe of the selected channel.

By way of example, the procedure for calibration or adjustment will be described for channel number 7 (since the selector switch 50 is illustrated in this position). Assuming that the knob of selector switch 50 has been set to channel number 7, the "low check" button 27 is pushed in and held. This connects in (to the common capacity chassis) the "low check point" for channel number 7. Then, while holding button 27 depressed, number 7 "separate zero potentiometer" 70 is adjusted until the recorder reads the predetermined value for "low check percent recorder."

Then, the low "low check" button 27 is released and "high check" button 30 is pushed in and held. This connects in (to the common capacity chassis) the "high check point" for channel number 7. Then, while holding button 30 depressed, number 7 "separate span potentiometer" 92 is adjusted until the recorder reads the predetermined value for "high check percent recorder."

The above procedure is repeated for all channels, by setting the knob of selector switch 50 to the different channels, one at a time.

If neither push button 27 nor pushbutton 30 is depressed, no switching voltage is applied to any of the leads 33 and the unit is in the "probe" or "run" position, wherein all of the capacitive measuring probes are connected to their individual corresponding remote transmitters. Then, measurement of liquid level in any desired channel may be made by setting the selector switch 50 so that the knob thereof indicates the desired channel. In this selector switch position, the appropriate "separate zero potentiometer" 70 and the appropriate "separate span potentiometer" 92 (as selected by the second and third decks of switch 50) are connected into the circuit of the capacity chassis.

During "probe" or "run," the capacity chassis illustrated in FIG. 2b (and described somewhat generally herein) operates in the manner described in detail in the above-referenced patent. Although a manual, selective setting of selector switch 50 (for selecting a desired channel or probe) was described hereinabove, this selector switch may be driven by a motor, or stepping device, during "probe" or "run." In this latter case, the recorder chart would record levels (or other physical characteristics represented by capacities) in sequence.

Although the system of this invention has been described in connection with a circuit using vacuum tubes (FIG. 2b), it is pointed out that it may with equal facility be used in connection with a solid-state or transistorized circuit.

The invention claimed is:

1. In an instrument for measurement at a recording point of a physical characteristic at a remote location: at the remote location, a circuit connected to a terminal at the recording point to provide an impedance thereat, a capacitive measuring probe whose capacitance varies with changes in said characteristic, said probe being normally connected to said circuit, a fixed calibration capacitor whose capacitance lies near one end of the range of variation of the probe capacitance, and a fixed calibration capacity whose effective capacitance lies near the other end of the range of variation of the probe capacitance; at the recording point, unitary means connected to said terminal for measuring the impedance provided thereat, and manually-operable switching means for effecting at the remote location, selectively, a substitution of said fixed capacitor for said probe, or a substitution of said fixed capacity for said probe, in said circuit, for calibration purposes.

2. Instrument according to claim 1, wherein said switching means includes means for alternatively transmitting two operating voltages of different characteristics to the remote location, and voltage-responsive means at said remote location for disconnecting said probe from said circuit and for alternatively connecting said fixed capacitor or said fixed capacity thereto, depending on which of said alternative voltages is received at said remote location.

3. In a system for measurement at a recording point of a physical characteristic at a selected one of a plurality of remote locations: at each remote location, a circuit connectible to a terminal at the recording point to provide an impedance thereat, a capacitive measuring probe whose capacitance varies with changes in the physical characteristic at the corresponding location, each probe being normally connected to its corresponding circuit, a fixed calibration capacitor whose capacitance lies near one end of the range of variation of the capacitance of the corresponding probe, and a fixed calibration capacity whose effective capacitance lies near the other end of the range of variation of the corresponding probe capacitance; at the recording point, unitary means connected to said terminal for measuring the impedance provided thereat, selector switch means for connecting the apparatus at a selected remote location to the apparatus at the recording point, and manually-operable switching means for selectively substituting either the fixed capacitor at the connected remote location for the probe at that location, or the fixed capacity at the connected remote location for the probe at that location, in the circuit at the connected remote location.

* * * * *